(12) United States Patent
Cyr et al.

(10) Patent No.: US 10,437,653 B2
(45) Date of Patent: Oct. 8, 2019

(54) EFFICIENT EVENT NOTIFICATION

(71) Applicant: THE BOEING COMPANY, Chicago, IL (US)

(72) Inventors: Kenneth J. Cyr, Covington, WA (US); Jonathan C. Roberts, Sammaish, WA (US); Don K. Bushell, Auburn, WA (US); Anthony Soo Kaim, New Westminster (CA); Peter D. Cornett, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 200 days.

(21) Appl. No.: 15/729,013

(22) Filed: Oct. 10, 2017

(65) Prior Publication Data

US 2019/0108071 A1 Apr. 11, 2019

(51) Int. Cl.
*H04L 12/00* (2006.01)
*G06F 9/54* (2006.01)
*H04L 29/08* (2006.01)
*G06F 16/29* (2019.01)
*G06F 16/951* (2019.01)

(52) U.S. Cl.
CPC .............. *G06F 9/542* (2013.01); *G06F 16/29* (2019.01); *G06F 16/951* (2019.01); *H04L 67/26* (2013.01); *H04L 67/306* (2013.01)

(58) Field of Classification Search
CPC ........ G06F 9/542; G06F 16/951; G06F 16/29; H04L 67/306; H04L 67/26
USPC ........ 709/204, 205, 207; 707/602, 708, 760, 707/767, 771
See application file for complete search history.

(56) References Cited

U.S. PATENT DOCUMENTS

| | | | |
|---|---|---|---|
| 2004/0083119 A1* | 4/2004 | Schunder | G06Q 10/10 705/1.1 |
| 2006/0085412 A1* | 4/2006 | Johnson | G06F 16/256 |
| 2008/0243807 A1* | 10/2008 | Gaucas | G06F 16/332 |
| 2009/0063649 A1* | 3/2009 | Yamagishi | H04N 21/4722 709/207 |

(Continued)

OTHER PUBLICATIONS

Francoise Fabret et al., "Filtering Algorithms and Implementaion for Very Fast Publish/Subscribe Systems", Retrieved Aug. 15, 2017, pp. 1-22.

(Continued)

*Primary Examiner* — Frantz Coby
(74) *Attorney, Agent, or Firm* — Womble Bond Dickinson (US) LLP

(57) ABSTRACT

A method is provided for efficient event notification in a computer system. The method includes processing messages as events at an event notification engine of a computer system maintaining a database of subscriptions of a plurality of subscribers, the subscriptions including first predicates stored in the database as first datums that are searchable. This includes receiving a message as an event including a second datum. The event is transformed into a query in a query language used to search the database, the second datum being transformed into a second predicate that is included in the query. The query is executed in the database to search the first datums for a first datum that matches the second predicate, and from the first datum, identifying a subscription that matches the event, the subscription being for a subscriber to which the event is routed.

30 Claims, 5 Drawing Sheets

(56) References Cited

U.S. PATENT DOCUMENTS

2015/0142887 A1* 5/2015 Gou ........................ H04W 4/21
                                                    709/204
2016/0196198 A1* 7/2016 Ajith Kumar ...... G06F 11/3495
                                                    714/45

OTHER PUBLICATIONS

Publish-subscribe pattern, Retrieved from Wikipedia Aug. 3, 2017, https://en.wikipedia.org/wiki/Publish%E2%80%93subscribe_pattern, pp. 1-6.

* cited by examiner

EFFICIENT EVENT NOTIFICATION

TECHNOLOGICAL FIELD

The present disclosure relates generally to event notification and, in particular, to efficient event notification with reduced computational requirements.

BACKGROUND

The amount of available digital information is exploding and much of it is made available across computer networks. Consumers of information often receive digital information in messages that are delivered according to some messaging pattern. In a request-reply pattern, the consumer sends a specific request for information of interest, and a source of the information responds to the request with the information. In some cases this involves use of a search engine that is designed to search the source or multiple possible sources for the information of interest. This request-reply pattern usually requires repeating the request each time the consumer desires more or new information.

Another messaging pattern referred to as publish-subscribe is designed to ease this problem by disseminating information only to interested users. A publish-subscribe system facilitates an information push paradigm in which users express long-term interest in ("subscribe to") information objects continuously released ("published") by some external agent. The success of a large scale publish and subscribe system relies both on the efficient identification of interested users for each information object and on the prompt delivery of the object to all interested users. In the environment of a large number of changing subscriptions for events in a high volume stream of events, traditional publish-subscribe systems often have trouble keeping pace, requiring an undesirable amount of computing resources.

Therefore it would be desirable to have a system and method that takes into account one or more of the issues discussed above, as well as other possible issues.

BRIEF SUMMARY

Example implementations of the present disclosure are directed to efficient event notification. Example implementations follow the publish-subscribe messaging pattern but uses an event to search for matching subscriptions, in contrast to the brute force approach in which the event is passed through all known subscriptions and each subscription is allowed to detect a match. Example implementations save considerable computing resources relative to the typical brute force approach, and are able to keep pace even in the environment of a large number of changing subscriptions for events in a high volume stream of events. Example implementations are also able to cover events from multiple publishers for multiple subscribers.

The present disclosure thus includes, without limitation, the following example implementations.

Some example implementations provide a method of efficient event notification in a computer system, the method comprising processing messages as events from a plurality of publishers. The messages are processed at an event notification engine of a computer system maintaining a database of subscriptions of a plurality of subscribers, and the subscriptions include first predicates stored in the database as first datums that are searchable. Processing the messages includes for a message of the messages, receiving the message as an event including a second datum, the event being received from a publisher of the plurality of publishers. Processing the messages also includes transforming the event into a query in a query language used to search the database, transforming the event including transforming the second datum into a second predicate that is included in the query. Processing the messages includes executing the query in the database to search the first datums for a first datum that matches the second predicate, and from the first datum, identifying a subscription that matches the event, the subscription being for a subscriber of the plurality of subscribers. And processing the messages includes routing the event to the subscriber.

In some example implementations of the method of any preceding or any subsequent example implementation, or any combination thereof, the first datum is of a first predicate including an attribute, a relational operator and a value. The first datum is formed of a key-value pair including a key that is unique to a combination of the attribute and the relational operator, and the value, with the key-value pair being one of a plurality of keys each of which is unique to a combination of the attribute and a corresponding one of a plurality of relational operators. In these example implementations, the second datum is formed of a key-value pair including a key that is the attribute, and the value. And transforming the second datum includes transforming the second datum into a plurality of second predicates each of which includes one of the plurality of keys, the corresponding one of the plurality of relational operators, and the value, the query including a logical disjunction of the second predicates.

In some example implementations of the method of any preceding or any subsequent example implementation, or any combination thereof, the first datum is of a first predicate including an attribute that describes distance from a geospatial point, a relational operator and a distance value. The first datum is formed of a cyclic polygon having a circumscribed circle with a circumcenter at the geospatial point and a circumradius equal to the distance value. In these example implementations, the second datum is formed of a geospatial attribute and a geospatial point value that intersects the cyclic polygon. And transforming the second datum includes transforming the second datum into the second predicate that describes intersection of the geospatial point value.

In some example implementations of the method of any preceding or any subsequent example implementation, or any combination thereof, the first datum is of a first predicate including an attribute that describes a geospatial region, and a relational operator that indicates inside or outside the geospatial region. The first datum is formed of a polygon or polyhedron. In these example implementations, the second datum is formed of a geospatial attribute and a geospatial point value that intersects the polygon or polyhedron. And transforming the second datum includes transforming the second datum into the second predicate that describes intersection of the geospatial point value.

In some example implementations of the method of any preceding or any subsequent example implementation, or any combination thereof, the first datum is of a first predicate including time as an attribute, and a chain of relational operators and earlier and later time values that describe a range. The first datum includes a pair of first datums formed of a first key-value pair and a second key-value pair including a first key and a second key paired with respective ones of the earlier and later time values. In these example implementations, the second datum is formed of a key-value pair including a key that is time, and a time value. Transforming second datum includes transforming the second datum into a pair of second predicates. One of the second predicates includes the first key, a greater-than-or-equal-to relational operator, and the time value. An other of the second predicates includes the second key, a less-than-or-equal-to relational operator, and the time value. The query includes a logical conjunction of the pair of second predicates.

In some example implementations of the method of any preceding or any subsequent example implementation, or any combination thereof, the first datum is of a first predicate including time as an attribute, and lower and upper unit of time values that describe a range of units of time relative to current time. The first datum includes a pair of first datums formed of a first key-value pair and a second key-value pair including a first key and a second key paired with respective ones of the lower and upper unit of time values. In these example implementations, the second datum is formed of a key-value pair including a key that is time, and a time value, and transforming second datum includes transforming the second datum into a pair of second predicates. One of the second predicates includes the first key, a greater-than-or-equal-to relational operator, and the difference of the time value and current time. An other of the second predicates includes the second key, a less-than-or-equal-to relational operator, and the difference of the time value and current time. The query includes a logical conjunction of the pair of second predicates.

In some example implementations of the method of any preceding or any subsequent example implementation, or any combination thereof, the method further comprises subscribing the subscriber before processing the message. Subscribing the subscriber includes receiving the subscription including a first predicate from the subscriber. Subscribing the subscriber also includes transforming the first predicate into the first datum that is searchable, and storing the subscription including the first datum in the database of subscriptions.

In some example implementations of the method of any preceding or any subsequent example implementation, or any combination thereof, the method further comprises unsubscribing the subscriber after processing the message. In these example implementations, unsubscribing the subscriber includes at least removing the subscription including the first datum from the database of subscriptions.

In some example implementations of the method of any preceding or any subsequent example implementation, or any combination thereof, the database includes a first database of internal subscriptions of a plurality of objects, and a second database of the subscriptions of the plurality of subscribers. The internal subscriptions include third predicates stored in the first database as third datums that are searchable. In these example implementations, transforming the event includes transforming the event into a first query in the query language used to search the first database. Executing the query includes at least executing the first query in the first database to search the third datums for a third datum that matches the second predicate, and from the third datum, identifying an internal subscription that matches the event, the internal subscription being of an object of the plurality of objects. Executing the query also includes receiving the internal subscription as a second event including the third datum. Executing the query includes transforming the second event into a second query in the query language used to search the second database, transforming the second event including transforming the third datum into a third predicate that is included in the second query. And executing the query includes executing the second query in the second database to search the first datums for a first datum that matches the third predicate, and from the first datum, identifying a subscription that matches the second event, the subscription being of the subscriber of the plurality of subscribers.

In some example implementations of the method of any preceding or any subsequent example implementation, or any combination thereof, the plurality of publishers include an aviation authority, and the messages include notice to airmen (NOTAM) messages from the aviation authority to alert pilots of hazards or potential hazards at particular geolocations. The plurality of subscribers include airlines with pilots flying aircraft along defined flight routes, and the subscriptions include subscriptions including first predicates that describe geolocations on or proximate to the defined flight routes. In these example implementations, processing the messages includes processing a NOTAM message identifying a particular geolocation of a hazard or potential hazard. Processing the NOTAM message includes at least receiving the NOTAM message as a NOTAM event including a second datum with the particular geolocation, the NOTAM message being received from the aviation authority. Processing the NOTAM message also includes transforming the NOTAM event into a particular query in the query language used to search the database, transforming the NOTAM event including transforming the second datum into a second predicate with the particular geolocation that is included in the query. Processing the NOTAM message includes executing the particular query in the database to search the first datums for the first datum that matches the second predicate, and thereby the subscription that matches the NOTAM event, the subscription being of an airline of the airlines. And processing the NOTAM message includes routing the NOTAM message to the airline.

Some example implementations provide a computer system for efficient event notification. The apparatus comprises a memory maintaining a database of subscriptions of a plurality of subscribers, the subscriptions including first predicates stored in the database as first datums that are searchable; and a processor programmed to implement an event notification engine configured to at least perform the method of any preceding or any subsequent example implementation, or any combination thereof.

Some example implementations provide a computer-readable storage medium for efficient event notification. The computer-readable storage medium is non-transitory and has computer-readable program code stored therein that in response to execution by a processor, causes a computer system to at least perform the method of any preceding or any subsequent example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
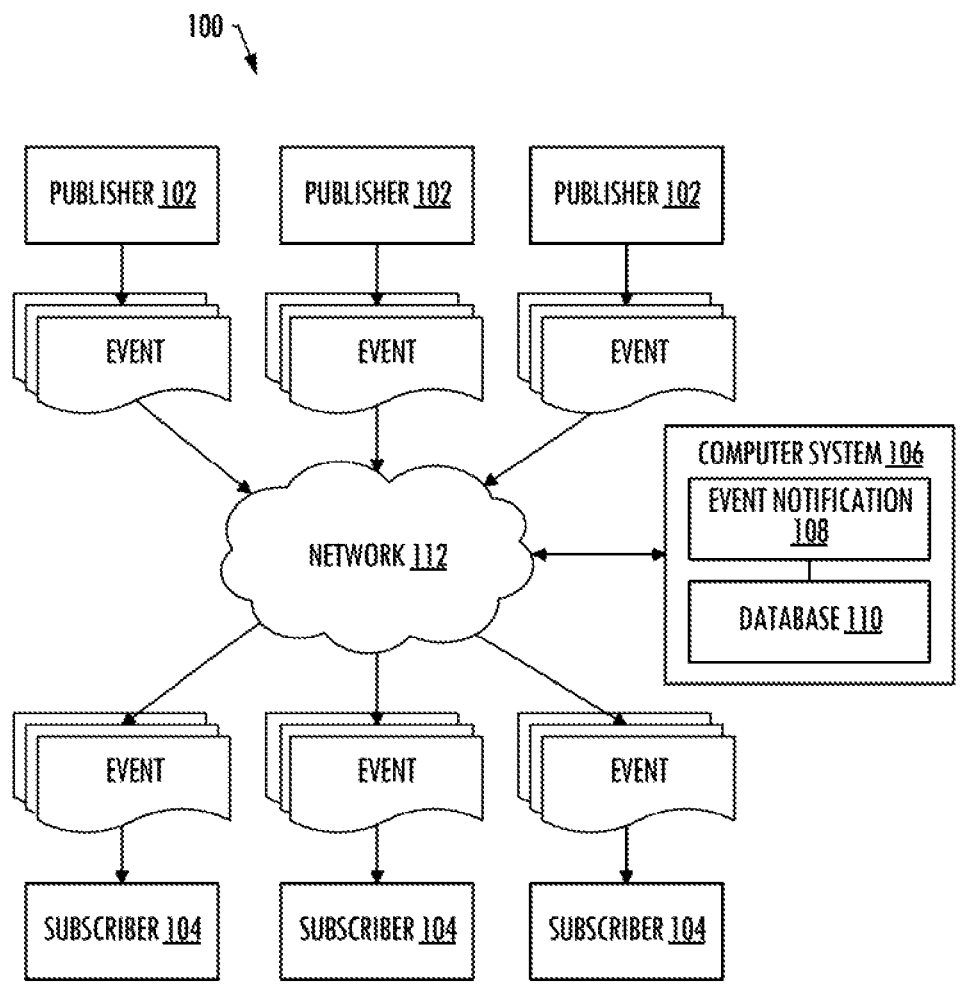
FIG. 1 illustrates an event-notification system according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something that may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to event notification and, in particular, to efficient event notification with reduced computational requirements.

FIG. 1 illustrates an event-notification system 100 for according to example implementations of the present disclosure. The system may include any of a number of different subsystems (each an individual system) for performing one or more functions or operations. As shown, in some examples, the system includes one or more of each of a publisher 102 of messages as events, a subscriber 104 of one or more of the events, and a computer system 106 including an event notification engine 108 and a database 110 of subscriptions. The subsystems may be co-located or directly coupled to one another, or in some examples, various ones of the subsystems may communicate with one another across one or more computer networks 112. Further, although shown as part of the system, it should be understood that any one or more of the publisher, subscriber or computer system may function or operate as a separate system without regard to any of the other subsystems. It should also be understood that the system may include one or more additional or alternative subsystems than those shown in FIG. 1.

Although the event-notification system 100 may be implemented in a number of different manners, in some examples the system is implemented in a cloud computing architecture. In these examples, the subscriber 104 and computer system 106 may implement respectively a front-end platform and a back-end platform of the architecture. The publisher 102 may be implemented as part of either the front-end platform or the back-end platform, depending on the particular implementation.

As described herein, the publisher 102 is generally a device configured to send messages as events. The subscriber 104 is generally a device configured to receive those of the events that are of interest to the subscriber, which is defined in a subscription. The subscription is registered with the computer system 106, and in particular the event notification engine 108 of the computer system, and stored in the database 110 of subscriptions maintained by the computer system. This is consistent with the publish-subscribe messaging pattern, except that the subscription of the subscriber may cover events from multiple publishers.

In accordance with the traditional publish-subscribe messaging pattern, the subscriptions of subscribers 104 include (first) predicates. But in accordance with example implementations of the present disclosure, these predicates are stored in the database 110 of subscriptions as (first) datums that are searchable. As used herein, a predicate is a Boolean-valued function of a datum. That is, a predicate is an operator or function, when applied to a datum, evaluates to either true or false depending on the property values of the datum. A datum is a collection of properties and their associated values. A datum is searchable in a database as a data item, whereas a predicate is not itself searchable in a database unless it is first transformed into a datum.

Figure 2:
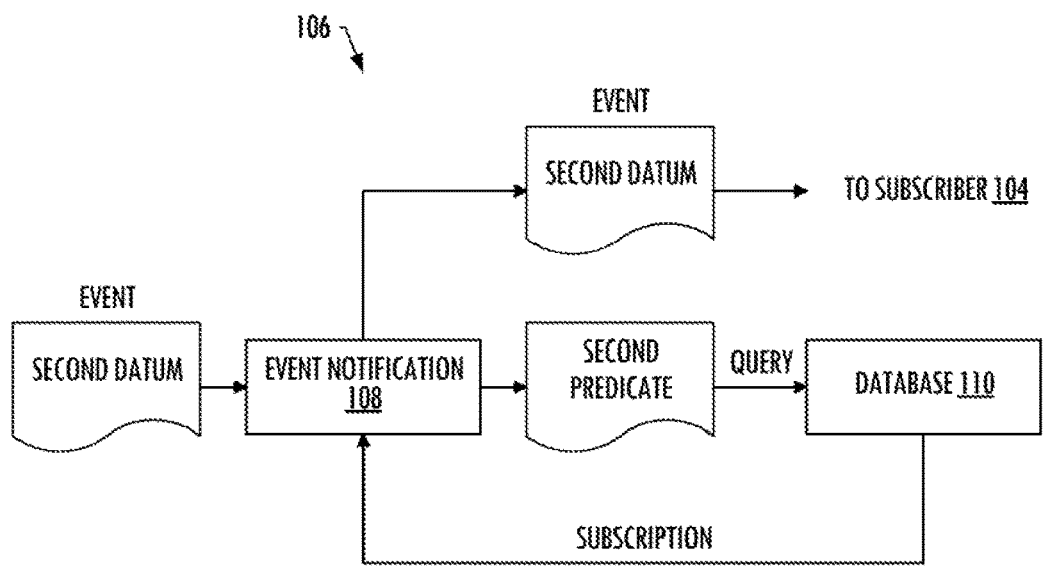
FIG. 2 illustrates the computer system of FIG. 1 being configured to process a message, according to various example implementations.

The event notification engine 108 is generally configured to process messages as events from publishers 102 to route those events to the appropriate ones of the subscribers 104. As shown in FIG. 2, for example, this includes for a message of the messages, the event notification engine being configured to receive the message as an event including a (second) datum. The event notification engine is configured to transform the event into a query in a query language used to search the database 110. This includes the event notification engine being configured to transform the second datum into a (second) predicate that is included in the query. The event notification engine is configured to execute the query in the database to search the first datums for a first datum that matches the second predicate, and from the first datum, identify a subscription that matches the event. the subscription being for a subscriber to which the event notification engine is then configured to route the event.

Figure 3:
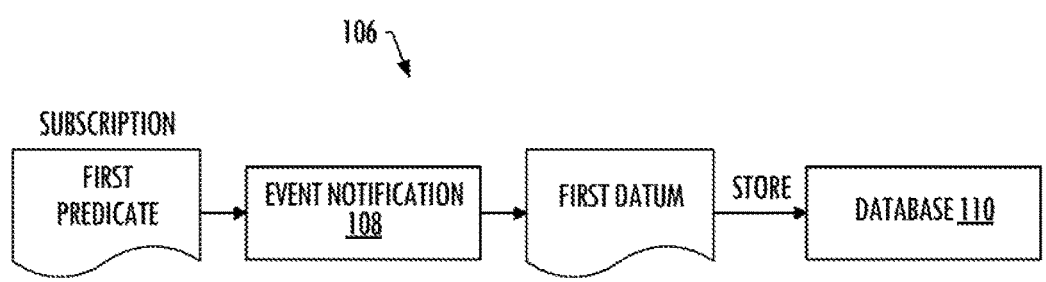
FIG. 3 illustrates the computer system of FIG. 1 being configured to subscribe a subscriber to an event, according to various example implementations.

In some examples, the event notification engine 108 is further configured to subscribe the subscriber 104 at some time before the message (event) routed to the subscriber is processed. As shown in FIG. 3, for example, this includes the event notification engine being configured to receive the subscription including a first predicate from the subscriber, transform the first predicate into the first datum that is searchable and store the subscription including the first datum in the database 110 of subscriptions. Conversely, in some examples, the event notification engine is further configured to unsubscribe the subscriber at some time after the message routed to the subscriber is processed. This includes the event notification engine being configured to at least remove the subscription including the first datum from the database of subscriptions.

In some examples, a first predicate of the subscription of a subscriber 104 includes an attribute, a relational operator and a value. In some of these examples, the event notification engine 108 is configured to transform the first predicate into a first datum for storage in the database 110, the first datum being formed of a key-value pair including a key that is unique to a combination of the attribute and the relational operator, and the value. In these examples, the key-value pair is one of a plurality of keys each of which is unique to a combination of the attribute and a corresponding one of a plurality of relational operators. For the event (message) routed to the subscriber, the second datum in the event is formed of a key-value pair including a key that is the attribute, and the value. The event notification engine 108 is configured to transform the second datum into a plurality of second predicates each of which includes one of the plurality of keys, the corresponding one of the plurality of relational operators, and the value. The query executed in the database 110 in some of these examples includes a logical disjunction of the second predicates.

In some examples, a first predicate of the subscription of a subscriber 104 includes an attribute that describes distance from a geospatial point, a relational operator and a distance value. In some of these examples, the event notification engine 108 is configured to transform the first predicate into a first datum for storage in the database 110, the first datum being formed of a cyclic polygon having a circumscribed circle with a circumcenter at the geospatial point and a circumradius equal to the distance value. For the event (message) routed to the subscriber, the second datum in the event is formed of a geospatial attribute and a geospatial point value that intersects the cyclic polygon. The event notification engine 108 is configured to transform the second datum into the second predicate that describes intersection of the geospatial point value.

In some examples, a first predicate of the subscription of a subscriber 104 includes an attribute that describes a geospatial region, and a relational operator that indicates inside or outside the geospatial region. In some of these examples, the event notification engine 108 is configured to transform the first predicate into a first datum for storage in the database 110, the first datum being formed of a polygon or polyhedron. For the event (message) routed to the subscriber, the second datum in the event is formed of a geospatial attribute and a geospatial point value that intersects the polygon or polyhedron. The event notification engine 108 is configured to transform the second datum into the second predicate that describes intersection of the geospatial point value.

In some examples, a first predicate of the subscription of a subscriber 104 includes time as an attribute, and a chain of relational operators and earlier and later time values that describe a range. In some of these examples, the event notification engine 108 is configured to transform the first predicate into a first datum for storage in the database 110, the first datum including a pair of first datums formed of a first key-value pair and a second key-value pair including a first key and a second key paired with respective ones of the earlier and later time values. For the event (message) routed to the subscriber, the second datum in the event is formed of a key-value pair including a key that is time, and a time value. The event notification engine 108 is configured to transform second datum into a pair of second predicates. One of the second predicates includes the first key, a greater-than-or-equal-to relational operator, and the time value, and an other of the second predicates includes the second key, a less-than-or-equal-to relational operator, and the time value. The query executed in the database 110 in some of these examples includes a logical conjunction of the pair of second predicates.

In some examples, a first predicate of the subscription of a subscriber 104 includes time as an attribute, and lower and upper unit of time values that describe a range of units of time relative to current time. In some of these examples, the event notification engine 108 is configured to transform the first predicate into a first datum for storage in the database 110, the first datum including a pair of first datums formed of a first key-value pair and a second key-value pair including a first key and a second key paired with respective ones of the lower and upper unit of time values. For the event (message) routed to the subscriber, the second datum in the event is formed of a key-value pair including a key that is time, and a time value. The event notification engine 108 is configured to transform second datum into a pair of second predicates. One of the second predicates includes the first key, a greater-than-or-equal-to relational operator, and the difference of the time value and current time, and an other of the second predicates includes the second key, a less-than-or-equal-to relational operator, and the difference of the time value and current time. The query executed in the database 110 in some of these examples includes a logical conjunction of the pair of second predicates.

Figure 4:
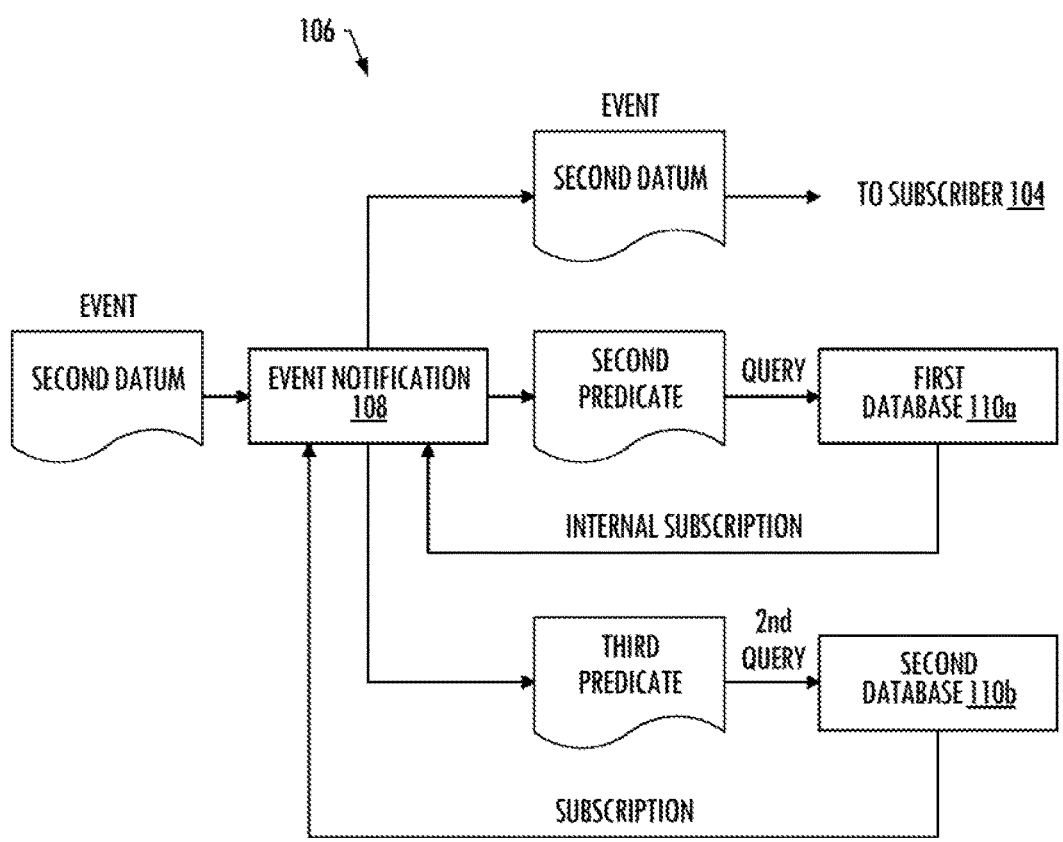
FIG. 4 illustrates the computer system of FIG. 1 being configured to process a message using an internal subscription, according to various example implementations.

FIG. 4 illustrates the computer system 106 of FIG. 1 being configured to process a message using an internal subscription, according to various example implementations. In these examples, the database 110 includes a first database 110*a* of internal subscriptions of a plurality of objects, and a second database 110*b* of the subscriptions of the plurality of subscribers. Similar to the subscriptions of subscribers, the internal subscriptions include third predicates stored in the first database as third datums that are searchable.

As shown in FIG. 4, the event notification engine 108 is configured to transform the event into a first query in the query language used to search the first database 110*a*. The event notification engine being configured to execute the query, then, may be broken into a number of operations. That is, in some examples, the event notification engine is execute the first query in the first database to search the third datums for a third datum that matches the second predicate, and from the third datum, identify an internal subscription that matches the event. The internal subscription is of an object of the plurality of objects.

The event notification engine 108 is configured to receive the internal subscription as a second event including the third datum, and transform the second event into a second query in the query language used to search the second database 110*b*. Similar to the earlier transformation, this transformation includes the event notification engine being configured to transform the third datum into a third predicate that is included in the second query. The event notification engine is then configured to execute the second query in the second database to search the first datums for a first datum that matches the third predicate, and from the first datum, identify a subscription that matches the second event. This subscription similar to before is of the subscriber of the plurality of subscribers.

Example implementations of the present disclosure may be useful in a number of different contexts. In some example contexts, the plurality of publishers 102 include an aviation authority, and the messages include notice to airmen (NOTAM) messages from the aviation authority to alert pilots of hazards or potential hazards at particular geolocations. In at least some of these examples, the plurality of subscribers 104 include airlines with pilots flying aircraft along defined flight routes, and the subscriptions include subscriptions including first predicates that describe geolocations on or proximate to the defined flight routes.

In some of the immediately above examples, the event notification engine 108 is configured to process a NOTAM message identifying a particular geolocation of a hazard or potential hazard. This includes the event notification engine being configured to receive, from the aviation authority (publisher 102), the NOTAM message as a NOTAM event including a second datum with the particular geolocation. The event notification engine is configured to transform the NOTAM event into a particular query in the query language used to search the database 110, including the event notification engine being configured to transform the second datum into a second predicate with the particular geolocation that is included in the query. The event notification engine is configured to execute the particular query in the database to search the first datums for the first datum that matches the second predicate, and thereby the subscription that matches the NOTAM event. The subscription is of an airline (subscriber 104) of the airlines, to which the event notification engine is configured to route the NOTAM message.

Further to FIG. 4, some example implementations make use of internal subscriptions to produce new events that may be fed back into the event notification engine 108. In these examples, raw events such as NOTAM messages are processed finding matching internal subscriptions, such as all flights that intersect in time and space. But instead of relating these subscriptions to subscribers 104, they are internal subscriptions for the flights as objects. A matching internal subscription may be identified and fed back into the event notification engine as a new event to supply the intersecting events to downstream subscribers.

In the examples including internal subscriptions, the computer system 106 may match all actions of a type (e.g., actual real time flight increments) with all intersecting events. A new data product is created which can be stored or streamed for analytics purposes and also fed back into the event notification engine 108 as new events. In some instances, this greatly simplifies the level of effort for a subscriber 104 to get these kinds of notifications. The subscriber may simply subscribe to events for a flight (e.g., by unique ID), a set of flights, all flights for an airline or some other filtered list of flights. Since the event notification engine is processing all current flights by default the incoming raw event (e.g., NOTAM message) is only processed once, creating a new event which easily matches to the subscription described above.

More specifically, consider a subscriber 104 who wants to receive messages about turbulence events that intersect with a single flight. In the example shown in FIG. 3, the subscriber can create a single subscription using the geospatial polygon/polyhedron of the flight route. In many instances, this is only as accurate as the original flight plan, and it is often fairly complex to create a polygon/polyhedron for the flight. If the subscriber desires greater accuracy, the subscriber may update the subscription as often as the subscriber receives flight following information. But if the flight route changes to intersect with a previous turbulence event, the subscriber may miss a relevant notification unless the subscriber requests prior intersecting turbulence events along the new flight route.

In the example shown in FIG. 4, the subscriber 104 may simply subscribe to turbulence events for the unique flight ID. The computer system 106 may maintain an in-memory representation (e.g., first database 110a) of a plurality of flights perhaps even every flight around the globe, updating constantly as the computer system receives flight following updates. The computer system may also maintain a collection of prior event intersections per flight. In this manner, the computer system may query the collection for relevant prior events if the flight route changes beyond a defined threshold. Likewise, the computer system may add new events intersecting along the new path and remove events not in scope from the collection.

In some example implementations described in greater detail below, the event-notification system 100 is implemented using the cloud computing service Microsoft Azure to provide event notifications over Hypertext Transfer Protocol (HTTP), HTTP Secure (HTTPS) or the like—generally referenced as HTTP(S). In these example implementations, the subscriber 104 may subscribe to messages of interest, and the event notification engine 108 may POST interesting messages to a subscriber's supplied Uniform Resource Locator (URL). In some examples, when subscribing, the subscriber may provide a (first) predicate as a filter to limit the events that will be sent to the subscriber, and a webhook the event notification engine should call each time an event meets the associated filter's criteria. When the event notification engine sees each event from each publisher 102, it determines which subscriptions' filters (first predicates) are met by the event. For each matching subscription, the event notification engine POSTs the event to that subscription's webhook. The subscriber can later unsubscribe from receiving the messages of interest.

In accordance with example implementations, the subscribing action is an exercise in transforming a filter into a searchable datum. Similarly, if inversely, processing an incoming event includes transforming that event into a query capable of yielding appropriate filters.

Consider for purposes of example, the below filter including a logical conjunction of attributes, relational operators and values. A logical disjunction attributes, relational operators and values may be similarly provided by respective filters each of which includes a respective attribute, relational operator and value.

| Example Filter |
| --- |
| location == {lat: 38.0727, lng: 127.2021}, airline == "KOR", arrivalTime == 2017-03-30T18:38:32+00:00 |

A matching event may include the following:

| Matching Event |
| --- |
| {    location: {lat: 38.0727, lng: 127.2021},    airline: "KOR",    arrivalTime: "2017-03-30T18:38:32+00:00", . . . } |

Conversely, a non-matching may include:

| Non-Matching Event |
|---|
| {<br>    location: {lat: 38.0726, lng: 127.2021},<br>    airline: "KOR",<br>    arrivalTime: "2017-03-30T18:38:31+00:00",<br>    ...<br>} |

In the above example, the filter is only searching for equality, but this is also a problem for location and time, which depending on granularity may be too limiting. In the above example, notice that the non-matching event does not match simply because its location is off by 0.0001 degrees latitude and its time is off by one second. Example implementations of the present disclosure support ranges in addition to strict equality.

A filter like that presented below provides ranges for both position and time:

| Range Filter |
|---|
| position "within 20 miles of" {lat: 38.0727, lng: 127.2021},<br>airline == "KOR",<br>arrivalTime "within 20 minutes before" 2017-03-30T18:38:32+00:00 |

The problem with the above, though, is that while query engines do handle range expressions in the query, they generally do not handle range expressions in the dataset. Example implementations have access to both the filter (dataset) and the event (source of the query), and transform both the filters and the events so that the range expressions wind up in the query and not in the dataset.

As illustrated above, three examples of filters (first predicates) that may be transformed include those with attributes including strings of characters (letters or numerical digits), those with attributes that describe a geospatial point or region, and those that include time as an attribute. Transformation of each type of filter into a (first) datum is described below according to some example implementations.

In some examples, an attribute of a filter including a string of characters may take the following form:
    key relational-operator value
where
    key is a key in the table or document of interest
    relational-operator is one of =, <, <=, >=, >, !=
    value is a value that key could possibly take on
Consider transformations to apply for each relational operator:

| Before Transformation | After Transformation |
|---|---|
| key = value | key.eq: value |
| key < value | key.lt: value |
| key <= value | key.lte: value |
| key >= value | key.gte: value |
| key > value | key.gt: value |
| key != value | key.ne: value |

A filter can also include an 'IN' such as:

| Filter with an IN Statement |
|---|
| foo IN ["a", "b"] |

The above may transform to the following datum:

| Filter with an IN as a Datum |
|---|
| {<br>    foo.in: ["a", "b"]<br>} |

In some examples, geospatial data comes in two subtypes: points and polygons (regions). As noted above, querying for point equality may be of little value. One of the primary relational operators used for a geospatial point is distance from the point, which may be re-expressed as "intersects a polygon of radius distance with point at its center."

In some examples, the polygon may be a cyclic polygon having a circumscribed circle with a circumcenter at the point and a circumradius equal to the distance. The more vertices a polygon has, the closer it is to a perfect circle centered at point with a true radius of distance. However, the more vertices a polygon has, the more computation is required to compare them for intersection, containment and the like. Rectangles and hexagons are both simple to calculate and in some examples offer an adequate "signal to noise" ratio in terms of few false positives.

A number of operations on geospatial polygons may be supported according to example implementations. Examples of suitable operations include distance( ), within( ) and intersects( ). Consider a filter containing a geospatial point:

| Filter with a Geospatial Component |
|---|
| {<br>    distance FROM {type: Point, {lat: 38, long: 127}} < 80 km<br>} |

The above filter may be transformed to a polygon with radius 80 km centered at {lat: 38, long: 127} (hexagon in this example). In some examples, the polygon may be configured to account for latitudinal distortion:

| Hexagon with Radius 80 km, Centered at {lat: 38, long: 127} |
|---|
| {<br>    polygon: [<br>        {lat: 38, lng: 128},<br>        {lat: 38.7, lng: 127.5},<br>        {lat: 38.7, lng: 126.5},<br>        {lat: 38, lng: 126},<br>        {lat: 37.3, lng: 126.5},<br>        {lat: 37.3, lng: 127.5}<br>    ]<br>} |

In some examples, polygons themselves do not require transformation.

Time can be expressed as wall time (i.e., what a clock reads) or as a number of units of time (e.g., seconds) relative to current (wall) time, and filters including each may be transformed to respective datums. As described herein, wall time may at times be referred to as "absolute time," and the expression of a number of units of time relative to current time may be referred to as "relative time."

A flight-plan is a geotemporal entity that may be expressed in time geolocation (geospatial point) pairs. At time t0, an aircraft will be at geolocation g0, (t1, g1), (t2, g2), etc. As such, a flight may be interested in temporal events occurring or predicted to occur at certain geotemporal locations. The geospatial portion may be as discussed above, and much like geospatial entities, one may consider temporal ranges rather than specific points in time. For example, if a flight is to be passing through a particular geospatial region G during the time range T, it may be interesting to know about events intersecting not only G but also T:

Filter with Absolute Time

```
{
    1491329925 < time < 1491335325,
    distance FROM {type: Point, {lat: 38, long: 127}} < 80 km,
}
```

The above may be transformed to data:

Absolute Time Filter Transformed to Datum

```
{
    time:
    {
        begin: 1491329925,
        end: 1491335325
    },
    polygon: [
        {lat: 38, lng: 128},
        {lat: 38.7, lng: 127.5},
        {lat: 38.7, lng: 126.5},
        {lat: 38, lng: 126},
        {lat: 37.3, lng: 126.5},
        {lat: 37.3, lng: 127.5}
    ]
}
```

A filter can also be specified indicating interest in events predicted to occur soon or events having recently occurred. That is, events close in time relative to current time (i.e., "now") as evaluated at the time the event is processed rather than as evaluated at the time the filter is submitted. For example:

Filter with Time Relative to Current Time

```
{
    time: [-3600 TO 1800] // 1 hour in the past to 30 minutes in the future
}
```

The above may be transformed to data:

Relative Time Filter Transformed to Datum

```
{
    arrivalTime.relative.gt: -3600,
    arrivalTime.relative.lt: 1800
}
```

In order to find applicable filters (predicates) that an event matches, the event may be transformed to contain ranges. An event arrives with a number of keys and values, similar to as follows:

Event with String Field Data

```
{
    key: value
}
```

The transformed event may replace this entry with the following query:

Event Expressed as a Query

```
SELECT id
FROM NOTAMS
WHERE key1.eq = value OR key1.lt < value OR key1.lte <= value OR
key1.gte >= value OR key1.gt > value OR key1.ne != value OR
key1.CONTAINS value
```

For geospatial data, points in events may be used in queries without transformation to polygons. A geospatial point datum may simply be transformed into a point query, and a geospatial region (polygon) datum may be transformed into a region query. An example point datum might be:

Point Datum

```
{
    location: {lat: 38, long: 127}
}
```

Its transformation might be:

Point Datum Transformed to Point Query

```
Select *
FROM data
WHERE ST_INTERSECTS(location, {
    'type': 'Point',
    'coordinates': [38, 127]
}
```

Temporal data may be expressed in an event as a point in time and may be compared either to an absolute time range or to a relative time range compared to current time. An example event with a time element might be:

Event with Time Field

```
{
    time: 1491330925,
    . . .
}
```

Transforming it into a query capable of finding either an absolute time range or to a relative time range comparing to now yields:

Event with Time Transformed to Event Query

```
SELECT *
FROM data
WHERE
(time.begin <= 1491330925 AND 1491330925 <= time.end) OR
(time.relative.gt <= 1491330925 - now( ) AND 1491330925 - now( ) <=
time.relative.lt)
```

Incorporating the above transformations, consider dataflows as may be implemented in Azure, one dataflow for managing filters, and the other for incoming events. The below example uses NOTAMs as a data source.

In the dataflow for managing filters, an application programming interface (API) user (subscriber) is interested in being notified about events that meet specific criteria. The API user POSTs to an addWebHook( ) RESTful endpoint supplying a JSON (JavaScript Object Notation) document that includes a filter and an URL where matching events should be POSTed. This is shown below:

| JSON Document Supplied by the API User |
|---|
| ```
{
    "URL" : "http://my.domain.com/filteredEvents/",
    "filter" : {
        "version" : "1.0",
        "activeDateRange" : {
            "begin" : "2017-03-30T18:38:32+00:00",
            "end" : "2018-03-30T18:38:32+00:00"
        },
        "conditions" : [
            {
                "type" : "GeoLocation",
                "units" : "km",
                "key" : "location",
                "relational operator" : "withinDistanceOfLocation",
                "distance" : 80,
                "location" : {
                    "lat" : 37.8,
                    "long" : 127.2021
                }
            },
            {
                "type" : "string",
                "key" : "airline",
                "relational operator" : "equals",
                "value" : "KOR"
            }
        ]
    }
}
``` |

After transformation to datum, the filter may have the following form:

| Filter After Transformation |
|---|
| ```
{
    "location.overlapsPolygon" : {
        "type" : "Polygon",
        "coordinates" : [
            [38, 128],
            [38.7, 127.5],
            [38.7, 126.5],
            [38, 126],
            [37.3, 126.5],
            [37.3, 127.5]
        ]
    },
    "airline.eq" : "KOR"
}
``` |

An incoming event has single-value data (except for geospatial polygons) that may be transformed into range queries in order to search for relevant filters. An example of an incoming event is shown below:

| Incoming Event |
|---|
| ```
{
    airline: "KOR",
    location: {
        "type": "Point",
        "coordinates": [38.1, 127.2]
    }
    ...
}
``` |

This event is transformed into the following query:

| Query Drawn from Incoming Event |
|---|
| ```
SELECT *
FROM EVENTS
WHERE (airline.eq = ("KOR" OR airline.lt < "KOR" OR airline.lte <=
"KOR" OR airline.gte >= "KOR" OR airline.gt > "KOR" OR
airline.ne = "KOR")
AND
ST_INTERSECTS(location,
    {
        "type": "Point",
        "coordinates": [38.1, 127.2]
    }
)
``` |

Figure 5:
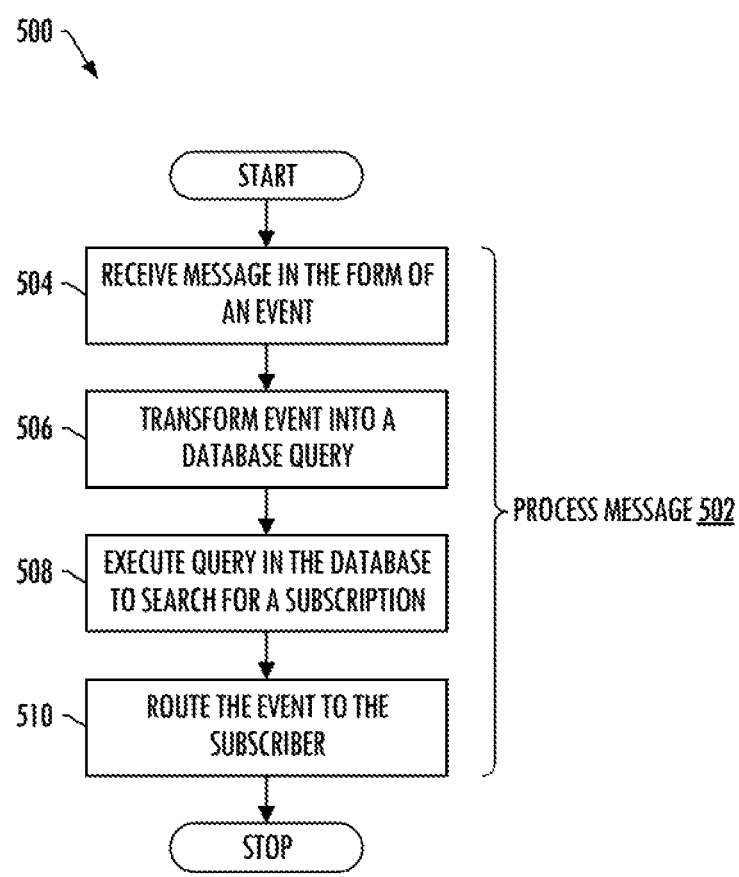
FIG. 5 is a flowchart illustrating various steps in a method of efficient event notification in a computer system, according to various example implementations.

FIG. 5 is a flowchart illustrating various steps in a method 500 of efficient event notification in a computer system 106. As shown at 502, the method includes processing messages as events from a plurality of publishers 102. The messages are processed at the event notification engine 108 of the computer system maintaining the database 110 of subscriptions of the plurality of subscribers 104. The subscriptions include first predicates stored in the database as first datums that are searchable. Processing the messages includes a number of steps for a message of the messages, as shown at blocks 504-508.

As shown at block 504, processing the message includes receiving the message as an event including a second datum, the event being received from a publisher 102 of the plurality of publishers. Processing the message also includes transforming the event into a query in a query language used to search the database 110, transforming the event including transforming the second datum into a second predicate that is included in the query, as shown at block 506. Processing the message includes executing the query in the database to search the first datums for a first datum that matches the second predicate, and from the first datum, identifying a subscription that matches the event, the subscription being for a subscriber 104 of the plurality of subscribers, as shown at block 508. And processing the message includes routing the event to the subscriber, as shown at block 510.

Example implementations of the present disclosure provide an approach that turns the concept of filtering on its head. A brute force approach would be to pass each event through all known filters (subscriptions with predicates) and allowing each filter to detect a match. The approach of example implementations uses each event to search for applicable filters, which significantly saves computation.

The cost of the brute force approach is calculated below:
Let:

$f :=$ number of filters (filters)

$\frac{\Delta e}{\Delta t} :=$ event arrival rate $\left(\frac{events}{second}\right)$ $C_b :=$ brute cost of using a filter $\left(\frac{\$}{filter \times event}\right)$ So, $$\text{total cost rate} \left(\frac{\$}{second}\right) = C_b f \frac{\Delta e}{\Delta t}$$

For example:

$$f = 3 \times 10^3 \text{ filters}$$

$$\frac{\Delta e}{\Delta t} = 10^3 \frac{\text{events}}{\text{second}}$$

$$C_b f \frac{\Delta e}{\Delta t} = 3 C_b \times 10^6 \frac{\$}{\text{second}}$$

In contrast, the cost of searching for appropriate filters is calculated below:
Let:

$$A_{f,e} := \text{\# applicable filters for event } e \text{(filters)}$$

$$\frac{\Delta e}{\Delta t} := \text{event arrival rate} \left(\frac{\text{events}}{\text{second}}\right)$$

$$C_s := \text{cost of searching for filters} \left(\frac{\$}{\text{filter} \times \text{event}}\right)$$

So, $$\text{total cost rate} \left(\frac{\$}{\text{second}}\right) = C_s A_{f,e} \frac{\Delta e}{\Delta t}$$

For example:

$$A_{f,e} = 3 \text{ filters}$$

$$\frac{\Delta e}{\Delta t} = 10^3 \frac{\text{events}}{\text{second}}$$

$$C_s A_{f,e} \frac{\Delta e}{\Delta t} = 3 C_s \times 10^3 \frac{\$}{\text{second}}$$

To compare the cost of these two approaches, consider their ratio:

$$\frac{C_b f \frac{\Delta e}{\Delta t}}{C_s A_{f,e} \frac{\Delta e}{\Delta t}} = \frac{C_b f}{C_s A_{f,e}}$$

In a number of examples, it is expected that the population of filters is high, the number of applicable filters for each event is low, and the cost of searching for a filter is not significantly higher than executing a single filter. In these examples, searching for filters requires significantly less computation than the brute force approach. To ground this in numbers, one may take the ratio of our examples above and find that the brute force method could easily be two or three orders of magnitude more computationally expensive than searching.

$$\frac{\text{brute force method}}{\text{filter search method}} = \frac{C_b}{C_s} \times 10^3$$

According to example implementations of the present disclosure, the event-notification system 100 and its subsystems including the publisher 102, subscriber 104 and computer system 106 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 6:
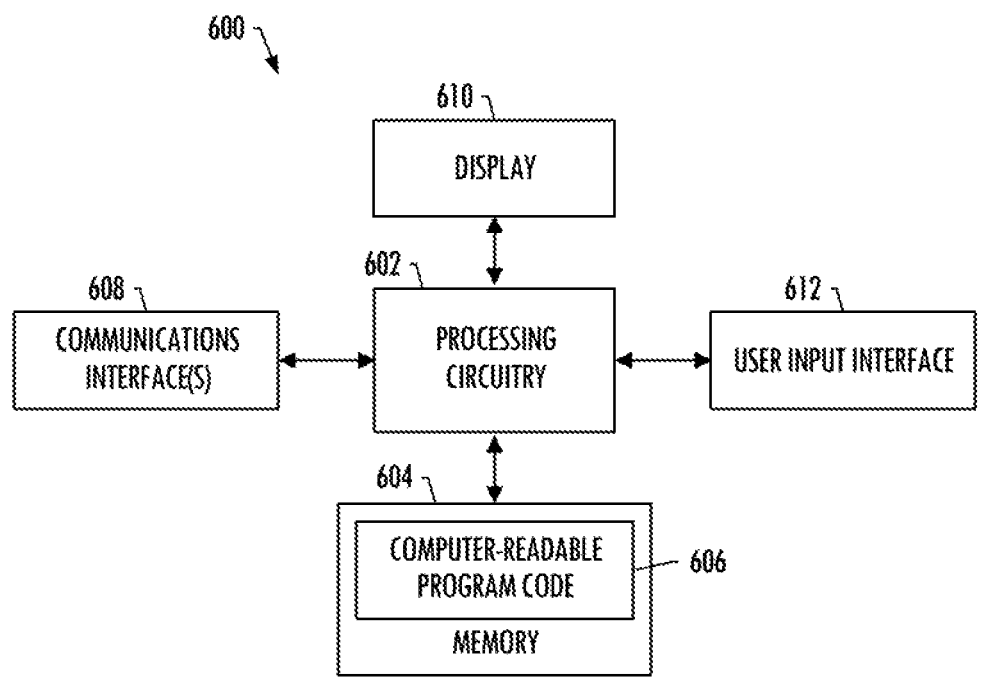
FIG. 6 illustrates an apparatus according to some example implementations.

FIG. 6 illustrates an apparatus 600 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processor 602 (e.g., processing circuitry) connected to a memory 604 (e.g., storage device).

The processor 602 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 604 (of the same or another apparatus).

The processor 602 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs or the like. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 604 is generally any piece of computer hardware that is capable of storing information such as, for example, data, computer programs (e.g., computer-readable program code 606) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 604, the processor 602 may also be connected to one or more interfaces for displaying, transmitting and/or receiving information. The interfaces may include a communications interface 608 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 610 and/or one or more user input interfaces 612 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 600 may include a processor 602 and a computer-readable storage medium or memory 604 coupled to the processor, where the processor is configured to execute computer-readable program code 606 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer system for efficient event notification, the computer system comprising:
  a memory maintaining a database of subscriptions of a plurality of subscribers, the subscriptions including first predicates stored in the database as first datums that are searchable; and
  a processor programmed to implement an event notification engine configured to at least:
  process messages as events from a plurality of publishers, including for a message of the messages, the event notification engine being configured to:
    receive the message as an event including a second datum, the event being received from a publisher of the plurality of publishers;
    transform the event into a query in a query language used to search the database, the event notification engine being configured to transform the event including being configured to transform the second datum into a second predicate that is included in the query;
    execute the query in the database to search the first datums for a first datum that matches the second predicate, and from the first datum, identify a subscription that matches the event, the subscription being for a subscriber of the plurality of subscribers; and
    route the event to the subscriber.

2. The computer system of claim 1, wherein the first datum is of a first predicate including an attribute, a relational operator and a value, the first datum being formed of a key-value pair including a key that is unique to a combination of the attribute and the relational operator, and the value, the key-value pair being one of a plurality of keys each of which is unique to a combination of the attribute and a corresponding one of a plurality of relational operators, and wherein the second datum is formed of a key-value pair including a key that is the attribute, and the value, and the event notification engine being configured to transform the second datum includes being configured to transform the second datum into a plurality of second predicates each of which includes one of the plurality of keys, the corresponding one of the plurality of relational operators, and the value, the query including a logical disjunction of the second predicates.

3. The computer system of claim 1, wherein the first datum is of a first predicate including an attribute that describes distance from a geospatial point, a relational operator and a distance value, the first datum being formed of a cyclic polygon having a circumscribed circle with a circumcenter at the geospatial point and a circumradius equal to the distance value, and wherein the second datum is formed of a geospatial attribute and a geospatial point value that intersects the cyclic polygon, and the event notification engine being configured to transform the second datum includes being configured to transform the second datum into the second predicate that describes intersection of the geospatial point value.

4. The computer system of claim 1, wherein the first datum is of a first predicate including an attribute that describes a geospatial region, and a relational operator that indicates inside or outside the geospatial region, the first datum being formed of a polygon or polyhedron, and wherein the second datum is formed of a geospatial attribute and a geospatial point value that intersects the polygon or polyhedron, and the event notification engine being configured to transform the second datum includes being configured to transform the second datum into the second predicate that describes intersection of the geospatial point value.

5. The computer system of claim 1, wherein the first datum is of a first predicate including time as an attribute, and a chain of relational operators and earlier and later time values that describe a range, the first datum including a pair of first datums formed of a first key-value pair and a second key-value pair including a first key and a second key paired with respective ones of the earlier and later time values, and wherein the second datum is formed of a key-value pair including a key that is time, and a time value, and the event notification engine being configured to transform second datum includes being configured to transform the second datum into a pair of second predicates, one of the second predicates including the first key, a greater-than-or-equal-to relational operator, and the time value, and an other of the second predicates including the second key, a less-than-or-equal-to relational operator, and the time value, the query including a logical conjunction of the pair of second predicates.

6. The computer system of claim 1, wherein the first datum is of a first predicate including time as an attribute, and lower and upper unit of time values that describe a range of units of time relative to current time, the first datum including a pair of first datums formed of a first key-value pair and a second key-value pair including a first key and a second key paired with respective ones of the lower and upper unit of time values, and wherein the second datum is formed of a key-value pair including a key that is time, and a time value, and the event notification engine being configured to transform second datum includes being configured to transform the second datum into a pair of second predicates, one of the second predicates including the first key, a greater-than-or-equal-to relational operator, and the difference of the time value and current time, and an other of the second predicates including the second key, a less-than-or-equal-to relational operator, and the difference of the time value and current time, the query including a logical conjunction of the pair of second predicates.

7. The computer system of claim 1, wherein the event notification engine is further configured to subscribe the subscriber before the message is processed, including the event notification engine being configured to:

receive the subscription including a first predicate from the subscriber;

transform the first predicate into the first datum that is searchable; and store the subscription including the first datum in the database of subscriptions.

8. The computer system of claim 1, wherein the event notification engine is further configured to unsubscribe the subscriber after the message is processed, including the event notification engine being configured to at least remove the subscription including the first datum from the database of subscriptions.

9. The computer system of claim 1, wherein the database includes a first database of internal subscriptions of a plurality of objects, and a second database of the subscriptions of the plurality of subscribers, the internal subscriptions including third predicates stored in the first database as third datums that are searchable, wherein the event notification engine being configured to transform the event includes being configured to transform the event into a first query in the query language used to search the first database, and wherein the event notification engine being configured to execute the query includes being configured to at least:

execute the first query in the first database to search the third datums for a third datum that matches the second predicate, and from the third datum, identify an internal subscription that matches the event, the internal subscription being of an object of the plurality of objects;

receive the internal subscription as a second event including the third datum;

transform the second event into a second query in the query language used to search the second database, the event notification engine being configured to transform the second event including being configured to transform the third datum into a third predicate that is included in the second query; and execute the second query in the second database to search the first datums for a first datum that matches the third predicate, and from the first datum, identify a subscription that matches the second event, the subscription being of the subscriber of the plurality of subscribers.

10. The computer system of claim 1, wherein the plurality of publishers include an aviation authority, the messages include notice to airmen (NOTAM) messages from the aviation authority to alert pilots of hazards or potential hazards at particular geolocations, the plurality of subscribers include airlines with pilots flying aircraft along defined flight routes, and the subscriptions include subscriptions including first predicates that describe geolocations on or proximate to the defined flight routes, and wherein the event notification engine being configured to process the messages includes being configured to process a NOTAM message identifying a particular geolocation of a hazard or potential hazard, the event notification engine being configured to process the NOTAM message including being configured to at least:

receive the NOTAM message as a NOTAM event including a second datum with the particular geolocation, the NOTAM message being received from the aviation authority;

transform the NOTAM event into a particular query in the query language used to search the database, the event notification engine being configured to transform the NOTAM event including being configured to transform the second datum into a second predicate with the particular geolocation that is included in the query;

execute the particular query in the database to search the first datums for the first datum that matches the second predicate, and thereby the subscription that matches the NOTAM event, the subscription being of an airline of the airlines; and route the NOTAM message to the airline.

11. A method of efficient event notification in a computer system, the method comprising:

processing messages as events from a plurality of publishers, the messages being processed at an event notification engine of a computer system maintaining a database of subscriptions of a plurality of subscribers, the subscriptions including first predicates stored in the database as first datums that are searchable, processing the messages including for a message of the messages:

receiving the message as an event including a second datum, the event being received from a publisher of the plurality of publishers;

transforming the event into a query in a query language used to search the database, transforming the event including transforming the second datum into a second predicate that is included in the query;

executing the query in the database to search the first datums for a first datum that matches the second predicate, and from the first datum, identifying a subscription that matches the event, the subscription being for a subscriber of the plurality of subscribers; and routing the event to the subscriber.

12. The method of claim 11, wherein the first datum is of a first predicate including an attribute, a relational operator and a value, the first datum being formed of a key-value pair including a key that is unique to a combination of the attribute and the relational operator, and the value, the key-value pair being one of a plurality of keys each of which is unique to a combination of the attribute and a corresponding one of a plurality of relational operators, and wherein the second datum is formed of a key-value pair including a key that is the attribute, and the value, and transforming the second datum includes transforming the second datum into a plurality of second predicates each of which includes one of the plurality of keys, the corresponding one of the plurality of relational operators, and the value, the query including a logical disjunction of the second predicates.

13. The method of claim 11, wherein the first datum is of a first predicate including an attribute that describes distance from a geospatial point, a relational operator and a distance value, the first datum being formed of a cyclic polygon having a circumscribed circle with a circumcenter at the geospatial point and a circumradius equal to the distance value, and wherein the second datum is formed of a geospatial attribute and a geospatial point value that intersects the cyclic polygon, and transforming the second datum includes transforming the second datum into the second predicate that describes intersection of the geospatial point value.

14. The method of claim 11, wherein the first datum is of a first predicate including an attribute that describes a geospatial region, and a relational operator that indicates inside or outside the geospatial region, the first datum being formed of a polygon or polyhedron, and wherein the second datum is formed of a geospatial attribute and a geospatial point value that intersects the polygon or polyhedron, and transforming the second datum includes transforming the second datum into the second predicate that describes intersection of the geospatial point value.

15. The method of claim 11, wherein the first datum is of a first predicate including time as an attribute, and a chain of relational operators and earlier and later time values that describe a range, the first datum including a pair of first datums formed of a first key-value pair and a second key-value pair including a first key and a second key paired with respective ones of the earlier and later time values, and wherein the second datum is formed of a key-value pair including a key that is time, and a time value, and transforming second datum includes transforming the second datum into a pair of second predicates, one of the second predicates including the first key, a greater-than-or-equal-to relational operator, and the time value, and an other of the second predicates including the second key, a less-than-or-equal-to relational operator, and the time value, the query including a logical conjunction of the pair of second predicates.

16. The method of claim 11, wherein the first datum is of a first predicate including time as an attribute, and lower and upper unit of time values that describe a range of units of time relative to current time, the first datum including a pair of first datums formed of a first key-value pair and a second key-value pair including a first key and a second key paired with respective ones of the lower and upper unit of time values, and wherein the second datum is formed of a key-value pair including a key that is time, and a time value, and transforming second datum includes transforming the second datum into a pair of second predicates, one of the second predicates including the first key, a greater-than-or-equal-to relational operator, and the difference of the time value and current time, and an other of the second predicates including the second key, a less-than-or-equal-to relational operator, and the difference of the time value and current time, the query including a logical conjunction of the pair of second predicates.

17. The method of claim 11 further comprising subscribing the subscriber before processing the message, subscribing the subscriber including:

receiving the subscription including a first predicate from the subscriber;

transforming the first predicate into the first datum that is searchable; and storing the subscription including the first datum in the database of subscriptions.

18. The method of claim 11 further comprising unsubscribing the subscriber after processing the message, unsubscribing the subscriber including at least removing the subscription including the first datum from the database of subscriptions.

19. The method of claim 11, wherein the database includes a first database of internal subscriptions of a plurality of objects, and a second database of the subscriptions of the plurality of subscribers, the internal subscriptions including third predicates stored in the first database as third datums that are searchable, wherein transforming the event includes transforming the event into a first query in the query language used to search the first database, and wherein executing the query includes at least:

executing the first query in the first database to search the third datums for a third datum that matches the second predicate, and from the third datum, identifying an internal subscription that matches the event, the internal subscription being of an object of the plurality of objects;

receiving the internal subscription as a second event including the third datum;

transforming the second event into a second query in the query language used to search the second database, transforming the second event including transforming the third datum into a third predicate that is included in the second query; and executing the second query in the second database to search the first datums for a first datum that matches the third predicate, and from the first datum, identifying a subscription that matches the second event, the subscription being of the subscriber of the plurality of subscribers.

20. The method of claim 11, wherein the plurality of publishers include an aviation authority, the messages include notice to airmen (NOTAM) messages from the aviation authority to alert pilots of hazards or potential hazards at particular geolocations, the plurality of subscribers include airlines with pilots flying aircraft along defined flight routes, and the subscriptions include subscriptions including first predicates that describe geolocations on or proximate to the defined flight routes, and wherein processing the messages includes processing a NOTAM message identifying a particular geolocation of a hazard or potential hazard, processing the NOTAM message including at least:

receiving the NOTAM message as a NOTAM event including a second datum with the particular geolocation, the NOTAM message being received from the aviation authority;

transforming the NOTAM event into a particular query in the query language used to search the database, transforming the NOTAM event including transforming the second datum into a second predicate with the particular geolocation that is included in the query;

executing the particular query in the database to search the first datums for the first datum that matches the second predicate, and thereby the subscription that matches the NOTAM event, the subscription being of an airline of the airlines; and routing the NOTAM message to the airline.

21. A non-transitory computer-readable storage medium for efficient event notification, the computer-readable storage medium being non-transitory and having computer-readable program code stored therein that in response to execution by a processor, causes a computer system to at least:

process messages as events from a plurality of publishers, the messages being processed at an event notification engine of a computer system maintaining a database of subscriptions of a plurality of subscribers, the subscriptions including first predicates stored in the database as first datums that are searchable, the computer system being caused to process the messages including for a message of the messages, the computer system being caused to:

receive the message as an event including a second datum, the event being received from a publisher of the plurality of publishers;

transform the event into a query in a query language used to search the database, the computer system being caused to transform the event including being caused to transform the second datum into a second predicate that is included in the query;

execute the query in the database to search the first datums for a first datum that matches the second predicate, and from the first datum, identify a subscription that matches the event, the subscription being for a subscriber of the plurality of subscribers; and route the event to the subscriber.

22. The computer-readable storage medium of claim 21, wherein the first datum is of a first predicate including an attribute, a relational operator and a value, the first datum being formed of a key-value pair including a key that is unique to a combination of the attribute and the relational operator, and the value, the key-value pair being one of a plurality of keys each of which is unique to a combination of the attribute and a corresponding one of a plurality of relational operators, and wherein the second datum is formed of a key-value pair including a key that is the attribute, and the value, and the computer system being caused to transform the second datum includes being caused to transform the second datum into a plurality of second predicates each of which includes one of the plurality of keys, the corresponding one of the plurality of relational operators, and the value, the query including a logical disjunction of the second predicates.

23. The computer-readable storage medium of claim 21, wherein the first datum is of a first predicate including an attribute that describes distance from a geospatial point, a relational operator and a distance value, the first datum being formed of a cyclic polygon having a circumscribed circle with a circumcenter at the geospatial point and a circumradius equal to the distance value, and wherein the second datum is formed of a geospatial attribute and a geospatial point value that intersects the cyclic polygon, and the computer system being caused to transform the second datum includes being caused to transform the second datum into the second predicate that describes intersection of the geospatial point value.

24. The computer-readable storage medium of claim 21, wherein the first datum is of a first predicate including an attribute that describes a geospatial region, and a relational operator that indicates inside or outside the geospatial region, the first datum being formed of a polygon or polyhedron, and wherein the second datum is formed of a geospatial attribute and a geospatial point value that intersects the polygon or polyhedron, and the computer system being caused to transform the second datum includes being caused to transform the second datum into the second predicate that describes intersection of the geospatial point value.

25. The computer-readable storage medium of claim 21, wherein the first datum is of a first predicate including time as an attribute, and a chain of relational operators and earlier and later time values that describe a range, the first datum including a pair of first datums formed of a first key-value pair and a second key-value pair including a first key and a second key paired with respective ones of the earlier and later time values, and
wherein the second datum is formed of a key-value pair including a key that is time, and a time value, and the computer system being caused to transform second datum includes being caused to transform the second datum into a pair of second predicates, one of the second predicates including the first key, a greater-than-or-equal-to relational operator, and the time value, and an other of the second predicates including the second key, a less-than-or-equal-to relational operator, and the time value, the query including a logical conjunction of the pair of second predicates.

26. The computer-readable storage medium of claim 21, wherein the first datum is of a first predicate composed of time as an attribute, and lower and upper unit of time values that describe a range of units of time relative to current time, the first datum including a pair of first datums formed of a first key-value pair and a second key-value pair including a first key and a second key paired with respective ones of the lower and upper unit of time values, and
wherein the second datum is formed of a key-value pair including a key that is time, and a time value, and the computer system being caused to transform second datum includes being caused to transform the second datum into a pair of second predicates, one of the second predicates including the first key, a greater-than-or-equal-to relational operator, and the difference of the time value and current time, and an other of the second predicates including the second key, a less-than-or-equal-to relational operator, and the difference of the time value and current time, the query including a logical conjunction of the pair of second predicates.

27. The computer-readable storage medium of claim 21 having computer-readable program code stored therein that in response to execution by the processor, causes the computer system to further subscribe the subscriber before the message is processed, including the computer system being caused to:
receive the subscription including a first predicate from the subscriber;
transform the first predicate into the first datum that is searchable; and
store the subscription including the first datum in the database of subscriptions.

28. The computer-readable storage medium of claim 21 having computer-readable program code stored therein that in response to execution by the processor, causes the computer system to further unsubscribe the subscriber after the message is processed, including the computer system being caused to at least remove the subscription including the first datum from the database of subscriptions.

29. The computer-readable storage medium of claim 21, wherein the database includes a first database of internal subscriptions of a plurality of objects, and a second database of the subscriptions of the plurality of subscribers, the internal subscriptions including third predicates stored in the first database as third datums that are searchable,
wherein the computer system being caused to transform the event includes being caused to transform the event into a first query in the query language used to search the first database, and
wherein the computer system being caused to execute the query includes being caused to at least:
execute the first query in the first database to search the third datums for a third datum that matches the second predicate, and from the third datum, identify an internal subscription that matches the event, the internal subscription being of an object of the plurality of objects;
receive the internal subscription as a second event including the third datum;
transform the second event into a second query in the query language used to search the second database, the computer system being caused to transform the second event including being caused to transform the third datum into a third predicate that is included in the second query; and
execute the second query in the second database to search the first datums for a first datum that matches the third predicate, and from the first datum, identify a subscription that matches the second event, the subscription being of the subscriber of the plurality of subscribers.

30. The computer-readable storage medium of claim 21, wherein the plurality of publishers include an aviation authority, the messages include notice to airmen (NOTAM) messages from the aviation authority to alert pilots of hazards or potential hazards at particular geolocations, the plurality of subscribers include airlines with pilots flying aircraft along defined flight routes, and the subscriptions include subscriptions including first predicates that describe geolocations on or proximate to the defined flight routes, and
wherein the computer system being caused to process the messages includes being caused to process a NOTAM message identifying a particular geolocation of a hazard or potential hazard, the computer system being caused to process the NOTAM message includes the computer system being caused to at least:
receive the NOTAM message as a NOTAM event including a second datum with the particular geolocation, the NOTAM message being received from the aviation authority;
transform the NOTAM event into a particular query in the query language used to search the database, the computer system being caused to transform the NOTAM event including being caused to transform the second datum into a second predicate with the particular geolocation that is included in the query;
execute the particular query in the database to search the first datums for the first datum that matches the second predicate, and thereby the subscription that matches the NOTAM event, the subscription being of an airline of the airlines; and
route the NOTAM message to the airline.

* * * * *